United States Patent

[11] 3,616,116

| [72] | Inventor | Ronald J. McDonald<br>10 Evergreen Ave., New Rochelle, N.Y. 10801 |
|---|---|---|
| [21] | Appl. No. | 834,273 |
| [22] | Filed | June 18, 1969 |
| [45] | Patented | Oct. 26, 1971 |

[54] PANEL STRUCTURE OF METAL SHEETS ENCLOSING A LOW DENSITY CORE
6 Claims, 21 Drawing Figs.

[52] U.S. Cl. .................................................. 161/39,
52/619, 108/150, 161/43, 161/44, 161/69, 161/99, 161/161
[51] Int. Cl. ....................................................... B32b 15/18
[50] Field of Search ........................................... 161/39, 69, 159-161, 99-100, 41, 43, 44; 108/150; 52/619

[56] References Cited
UNITED STATES PATENTS

| 2,579,157 | 12/1951 | Price, Sr. et al. ............... | 52/619 |
| 3,150,032 | 9/1964 | Rubenstein .................... | 161/161 |
| 3,496,689 | 2/1970 | Nerem ........................... | 161/161 X |
| 2,911,274 | 11/1959 | Grube ............................ | 52/619 |
| 2,585,082 | 2/1952 | Bollinger, Jr. ................. | 52/619 X |

*Primary Examiner*—Philip Dier
*Attorney*—Abner Sheffer

ABSTRACT: Tables and other articles of furniture having closely spaced-parallel substantially flat smooth stainless steel surfaces of substantial area joined by integral narrow transverse smooth stainless steel surfaces. They may be made by bending large thin stainless steel sheets at their margins to form flaps, cementing parallel sheets to a low-density core, welding the flaps together to form a raised weld bead between the bend lines and grinding down the bead and part of the surface of at least one flap.

PATENTED OCT 26 1971 3,616,116

PANEL STRUCTURE OF METAL SHEETS ENCLOSING A LOW DENSITY CORE

This invention relates to the construction of furniture having metal surfaces, and in particular stainless steel surfaces.

The invention provides new articles of furniture having the appearance of being made of large flat pieces of solid stainless steel but which are of reasonable weight, Heretofore, this has been considered unobtainable.

My invention has made it possible to construct such articles; to minimize weight to practical standards in furniture while maintaining the appearance of solid metal or stainless steel sections of substantial area and with a stable rigid surface; to maintain a uniform flat finished metal surface without constructing inborn stresses into the furniture that would cause buckles, warps, or unevenness after the welding, grinding, and polishing (of the weld) has been completed and the metal cools; and to provide furniture having wall thicknesses, such as seven-eighths inch, appearing both visually and tactically of solid metal structure; and to provide such furniture which can structurally support heavy glass tops and/or other tops or objects placed on top of the furniture unit.

In the accompanying drawings, which illustrate certain preferred forms of the invention, to scale, FIGS. 1 and 2 show two forms of tables, FIGS. 3, 4 and 5 show three forms of bases for tables, FIG. 6 is a plan view illustrating schematically the various parts used in the construction of the base shown in FIG. 5, FIG. 7 illustrates a table top, FIG. 8 is an exploded view showing the elements used in constructing the table of FIG. 1, FIG. 9 illustrates a section through the dies used for bending the sheet metal to form flaps, FIG. 10 shows the bent flaps before a spot-welding operation, FIG. 11 is a top view showing the flaps after spot-welding, FIG. 12 is a cross-sectional view along the line 12—12 of Fig. 11, FIG. 13 is a top view showing the fully welded flaps, FIG. 14 is a cross-sectional view along the lines 14—14 of FIG. 13, FIGS. 15A and 15B are views of undesirable flap construction, FIGS. 16 and 17 are cross-sectional views, on a larger scale, illustrating the configuration of the welded flaps after grinding.

Figure 9:
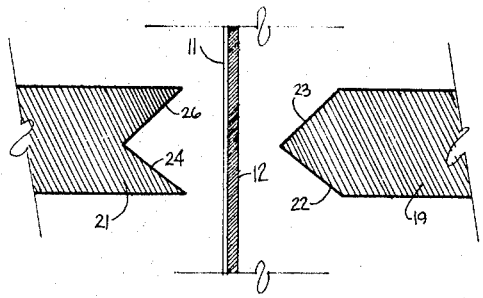

All the articles of furniture shown herein are constructed from thin sheet material having a thickness in the range of about 0.02 to 0.08 inch, preferably about one thirty-second to one-sixteenth inch. Excellent results have been obtained by the use of 18 gauge sheets of type 304 stainless steel, whose thickness is about 0.05 inch (U.S. Standard Gauge). As normally supplied, stainless steel sheets have a smooth finish such as a "2B" mill finish and are, say 4 feet wide and some 12 feet long. In the preferred process of this invention, one side of each such flat sheet is prepolished in known manner, e.g. to give a shiny surface designated as No. 8 mirror finish or a surface known in the trade as "Rough" No. 4 satin, and each of the polished surfaces is then covered with a thin flexible protective layer 11 (FIG. 9) having a pressure-sensitive adhesive, on one side; the adhesive serves to bond the protective layer to the polished surface. A suitable protective layer of this type is an adhesive-coated vinyl plastic film of known type.

The protected metal sheets are then cut to the desired size, e.g. with a shear of a type known in the sheet metal trade.

Figure 1:
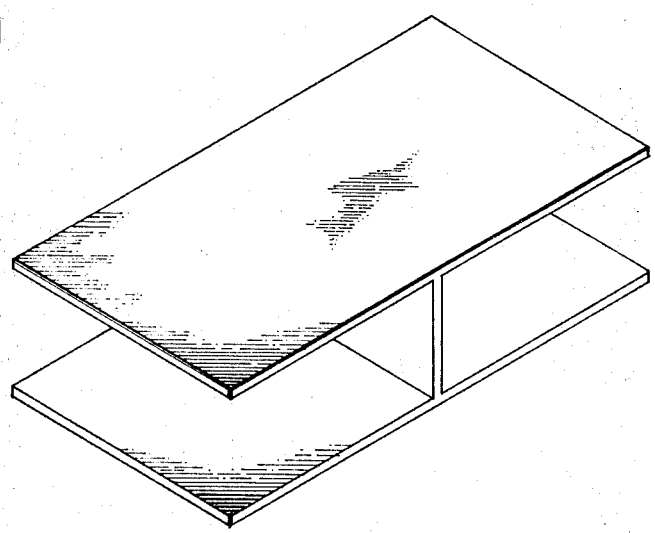
Figure 8:
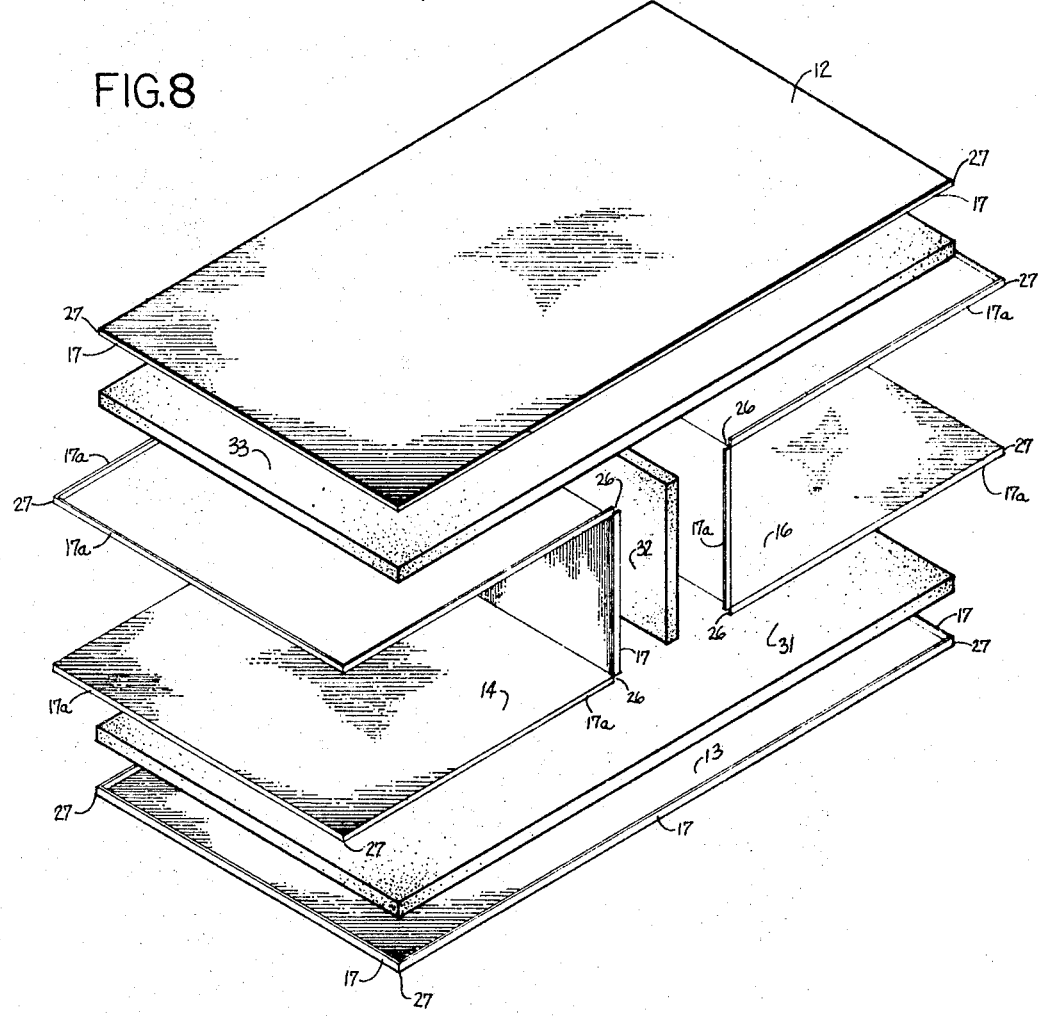

The table shown in FIGS. 1 and 8 is made by combining four such cut sheets. Typical overall dimensions of these cut sheets are, for the top sheet 12 and bottom sheet 13, 28⅞ inches by 54⅞ inches rectangular and for each of the two side sheets 14 and 16, 28⅞ by 67¼ inches rectangular. Cutting is done accurately (e.g. to within 0.001 inch of the predetermined dimensions).

Two of the cut sheets, namely sheets 12 and 13, are then bent at the predetermined angle. Thereafter all the cut sheets are bent over at their margins to form narrow flaps 17, 17a, along bend lines spaced from the edges by distances such that complementary flaps (i.e. flaps 17 and 17a) span a distance equal to the total thickness of the final laminate. However, the flaps are not bent to 90° to the main area of the sheet, but at a slightly larger angle, preferably an angle which is about 1° to 10° (and, for best results, about 1° to 3°, most preferably about 2°) larger, such as the 93° angle shown in FIG. 9. To this end, the mating male die 19 (FIG. 9) and female die 21 used for the bending of the flaps have their operative surfaces (22, 23 and 24, 26 respectively) also at a corresponding angle, e.g. 93° as illustrated.

Before the flaps are formed, appropriate slits (for the corners 26, FIG. 9) and square notches (for the corners 27) are cut at the margins of the sheet material, prior to bending.

All bending is done accurately along bend lines, which, particularly for the flaps, are located within about 0.001 inch of the predetermined bend line. The male and female dies used for bending are kept clean and free of particles of dirt which would cause "stretch marks" to be impressed into, and thus mar, the surface of the steel during the bending process. The presence of the protective layer 11 helps to reduce the occurrence of stretch marks. This layer is removed at the flaps, after the bending operation. At that time the remaining film is supplemented by a more rigid protective layer, such as a sheet of fiberboard (Masonite) one-eighth inch thick (not shown).

The structure illustrated in FIGS. 1 and 8 of the drawings includes three sheets (31, 32, 33) of inner core material. Outstanding results have been obtained by the use of rigid polyvinyl chloride foam board, particularly the material sold as "Rigicell" as manufactured by the B.F. Goodrich Co., most suitably a grade of this material with a density of about 2 to 6 (e.g. 2.3 to 5.7) (ASTM D 1622–63) pounds per cubic foot, an ultimate compressive strength in the range of about 45 to 250 p.s.i. (ASTM D 365–57 p.s.i.) and a shear strength (ultimate p.s.i.) in the range of 40–170 p.s.i. (ASTM CZY 3–61). Sheets about three-fourths inch thick (preferably sanded so that the thickness variation over substantially the whole sheet is about ±0.007 inch) have given very good results. In general the thickness of the core will be in the range of about one-half inch to 1 inch although thicker constructions are within the broader scope of the invention. The results obtained with the expanded polyvinyl chloride are superior to those obtained by the use of commercial expanded polystyrene sheets (e.g. "Styrofoam of density about 1.8 to 2.2 lbs/cu. ft.) or plywood.

Figure 10:
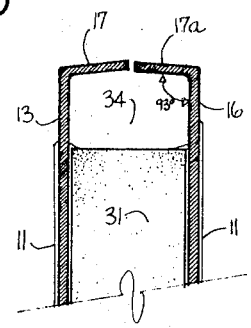

As indicated in FIG. 10 the sheets 31 (and 32 and 33) of inner core material are cut slightly shorter than the corresponding abutting metal sheets 13 and 16 so that there is an air space 34 between the edges of the inner core sheets and the 17, 17a. Typically the distance between the edge of the inner core sheet and the adjacent bent flaps is less than an inch and more than one-eighth inch; a distance of about one-half inch has been found to be very suitable.

The sheets of inner core material are bonded to the corresponding unpolished surfaces of the bent, cut stainless steel sheets by means of any suitable adhesive. An epoxy type of adhesive (e.g. Epon 919, a two-part adhesive of Shell Chemical Co., which is a diphenylolpropane-epichlorohydrin condensation product) has given excellent results. The assembly is held together tightly and evenly (as by means of suitable clamps some of which press against flat steel bars which extend across the stainless steel sheets and are in contact with the rigid protective covering (e.g. the fiberboard previously described) while the adhesive is setting.

Figure 11:
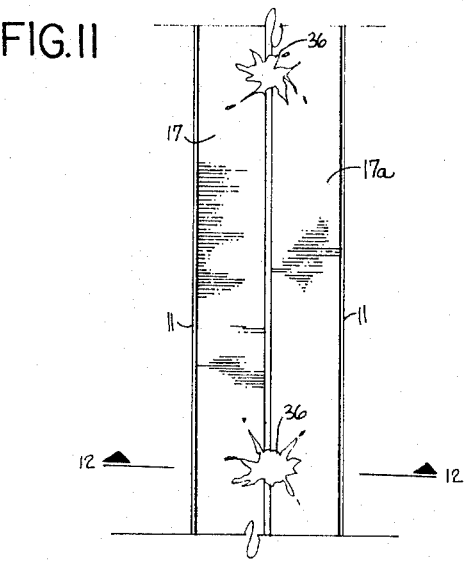
Figure 12:
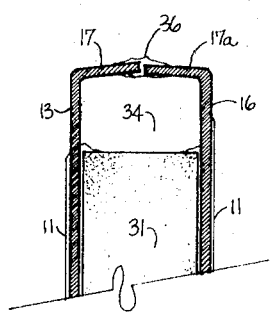

After the adhesive has thoroughly cured the edge flaps are welded together. In a preferred procedure, the flaps are first spot-welded together at points spaced several inches apart (e.g. some 1 to 10 inches apart, preferably about 3 to 4 inches apart, as indicated at 36 in FIG. 11. This operation need not be done with perfect accuracy. As shown in FIG. 12, the flaps after spot welding generally are at an angle of more than 90° to the main areas of the sheet.

Figure 13:
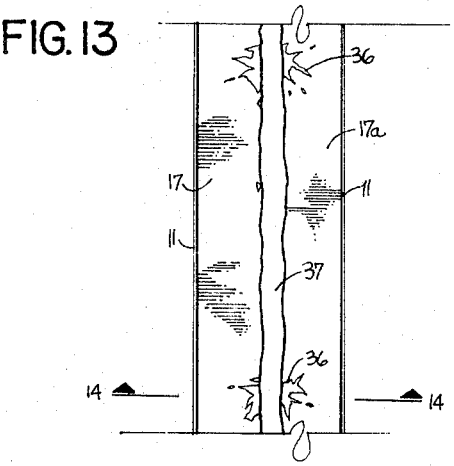
Figure 14:
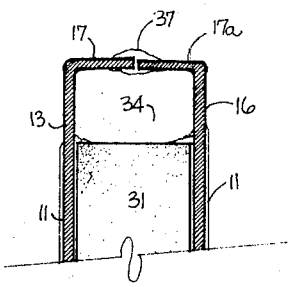

The edges of the flaps are then welded together along substantially their entire length. It has been found especially suitable to do this with semiautomatic welding systems for gas-shielded consumable electrode welding (metal inert gas); an automatic portable hand welding gun, or oscillatory gun, or a straight torch can be mounted upon a fixture such as an aluminum beam of any required length upon which there is secured a track on which the gun or straight torch is positioned for movement parallel to the edges of the flaps, with the consumable bare electrode of the welding system in operative position adjacent to the complementary edges of the flaps 17, 17a to produce a long continuous weld bead 37 along said edges, as illustrated in FIGS. 13 and 14. This weld extends along a line halfway between the bent edges of the two metal sheets, e.g. 13, 16. The welding is preferably done with a stainless steel (e.g. type 304) welding filler wire to produce a stainless steel weld bead. During welding the surface of the material is preferably protected by a suitable inert gas.

During the operation of welding the long flaps together, the corners 26 and 27 are left unwelded. This permits expanding air and the inert protective gas, heated by the welding operation, to escape (after passing through the spaces 34 between the edges of the inner core and the flaps). Buckling of the assembly, or undue stress thereon, is thereby prevented. The use of conventional heat sinks (e.g. copper bodies of large mass and wet cloths) in contact with the stainless steel sheets 13, 16 helps to absorb undesirable excess heat and protect the core against thermal degradation.

Internal corners 26 are then welded (to fill them with a rectangular piece of the stainless steel sheet of a size corresponding to the open space left by the slitting and bending operation), and then finally the outside corners 27 are welded.

Figures 15A, 15B:
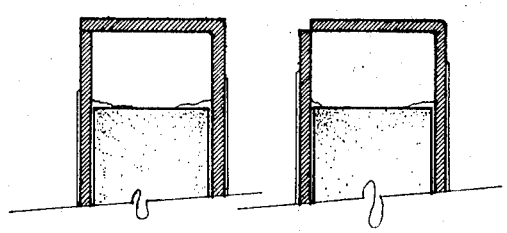

The operation of welding the long flaps together produces a bead which is present only on the edges of the assembly and is not present on any part of the large flat surfaces. Even if the automatic welding apparatus becomes disaligned or does not operate properly the resulting defect will be present only on these edges. In contrast, if the flaps were made as in FIG. 15A or 15B requiring welding at the corner, disalignment of the automatic welding apparatus could seriously damage the appearance of the large flat polished surfaces; such damage is very noticeable and difficult to remove. Furthermore, I have found that welding flaps as in FIG. 15A and FIG. 15B tends to produce buckling of the product, which does not occur when my method is employed; the reasons for this are not clear but are believed to be related to the unsymmetrical distribution of stresses resulting from unsymmetrical heating to subsequent cooling which occur in the undesirable construction.

Figure 16:
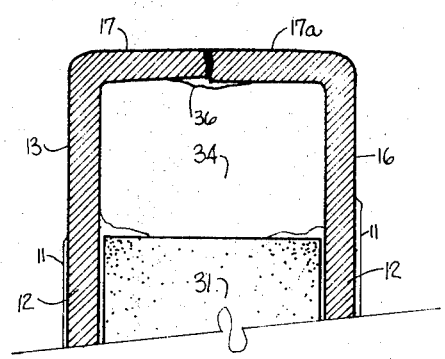
Figure 17:
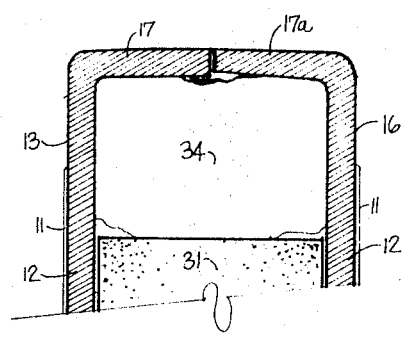

On welding the angle between the flaps and the main areas of the sheet is decreased (possibly because of the heating and colling effects and some pressure exerted by the welding equipment) so that this angle is no longer about, say, 91°–95° (FIG. 10) but is a smaller angle, at least 90° e.g. about 91° (FIG. 14). This helps make for easy grinding of the resulting weld bead. The narrow areas of the structure, that is the areas formed by the joined flaps, are now ground to a smooth relatively even surface (as shown in FIGS. 16 and 17) and then polished to the desired finish (e.g. a No. 3 satin finish or No. 8 mirror finish). With the construction described herein it is simple to perform this operation without contacting the large flat prefinished surfaces with the grinding and polishing tools and without causing a wavy appearance at the edges. During the grinding operation a portion of the surface of one or both of the flaps is removed so as to produce the smooth even surface on which no sign of a weld line or other indication of two-piece construction is apparent. Owing to such surface removal, the thickness of the final ground material is nonuniform; typical cross sections after grinding (and polishing) are shown in FIGS. 16 and 17, from which it will be evident that the hidden unexposed surface of the flaps and weld line is uneven.

The table shown in FIGS. 1 and 8 may of course be produced in various sizes and dimensions. Typical dimension of the top 12 of the table are about 2 to 4 feet wide by about 3 to 5 feet long. Typical dimensions of the central web (in which core member 32 is located) are about 1 to 2 feet in height by about 1 to 4 feet in width.

Figure 2:
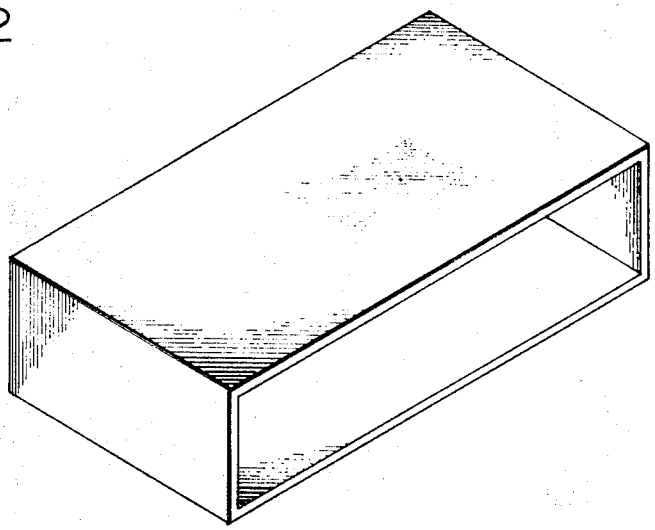

It will be apparent to those skilled in the art that the table shown in FIG. 2 may be constructed in a similar manner from two pairs of pieces of sheet metal (each L-shaped, or one pair U-shaped and the other pair flat) and four pieces of core material. In this case there will also be two outside corners formed as in FIG. 15A or 15B (which require special and extra care in positioning for welding and grinding and polishing) at the intersection of two large planes.

Figure 3:
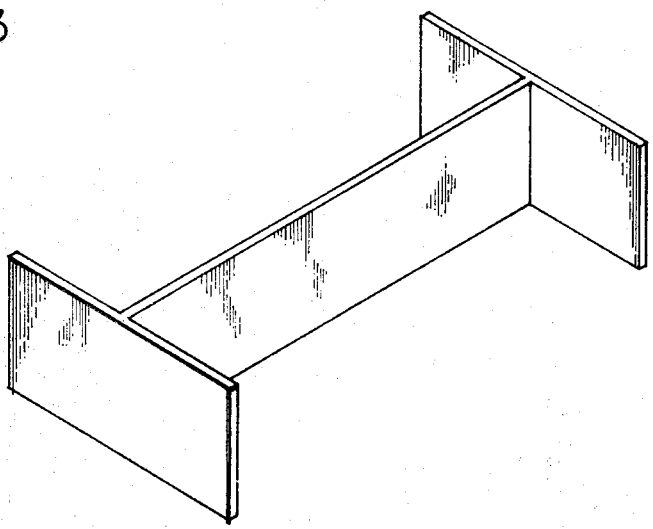
Figure 4:
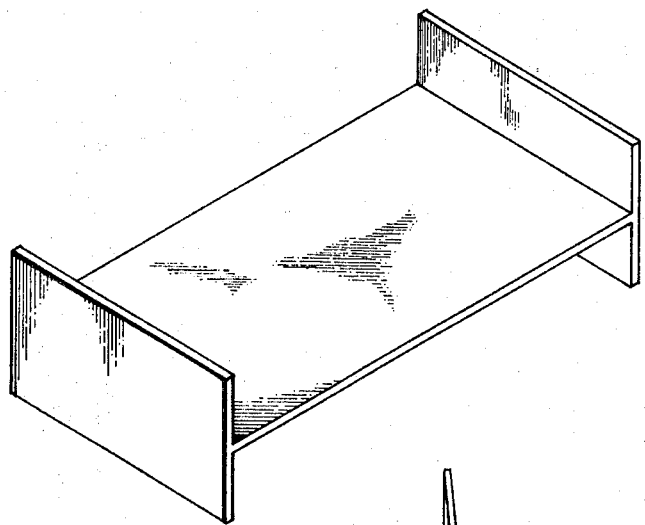

The bases shown in FIGS. 3 and 4 may be formed in the very same way as the table of FIG. 1. It will be evident that their elements are the same except that the relative dimensions may be different; that is, all have two rectangular areas joined by a central web, as in an I-shape. The bases of FIGS. 3 and 4 may be used to support a flat top of any type, such as a top made of glass or transparent plastic (e.g. polymethyl methacrylate) or a top such as shown in FIG. 7.

Figure 5:
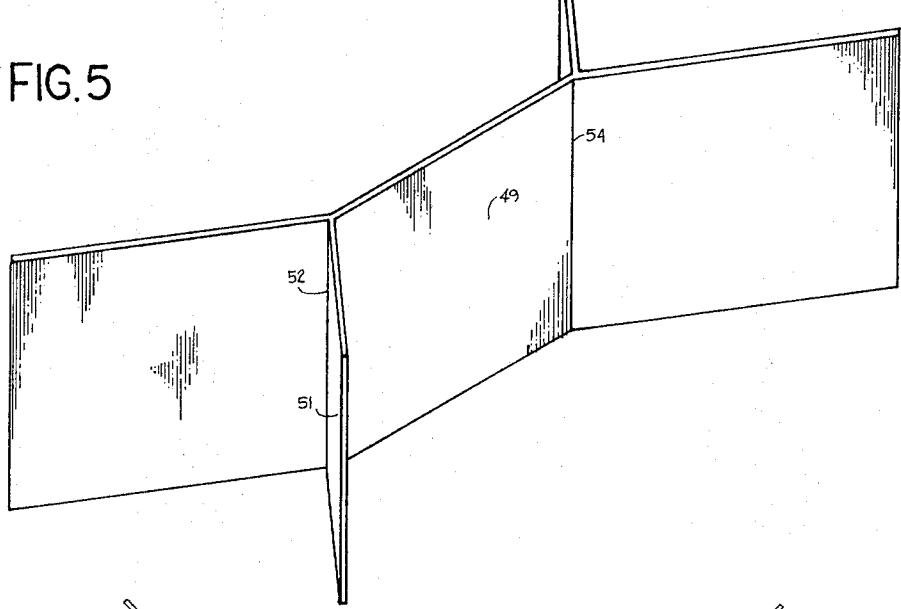
Figure 6:
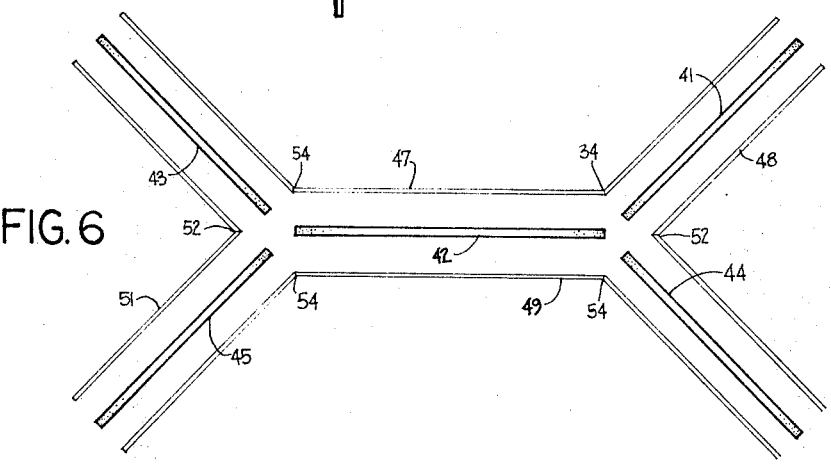

The base shown in FIGS. 5 and 6 is made in a manner similar to that illustrated for the table of FIG. 1. Here five rectangular pieces (41, 42, 43, 44 and 45) of core material are used and four bent pieces (47, 48, 49 and 51) of sheet metal. The pieces 48 and 51 have right-angle bends (52), while the pieces 47 and 49 have 135° bends (54).

Figure 7:
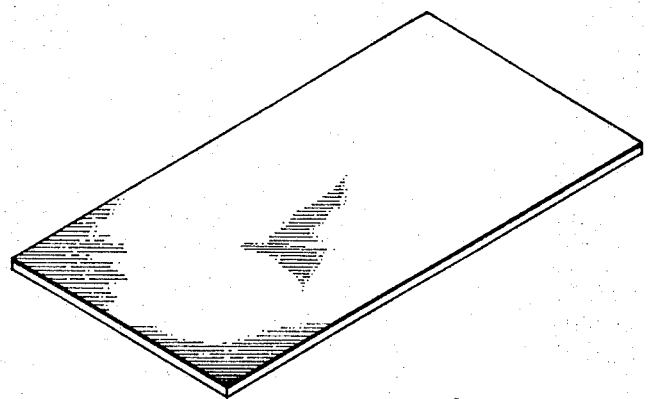

The table top shown in FIG. 7 is a plain flat top which may be constructed of two rectangular pieces of sheet metal and a single piece of core material.

Figure 18:
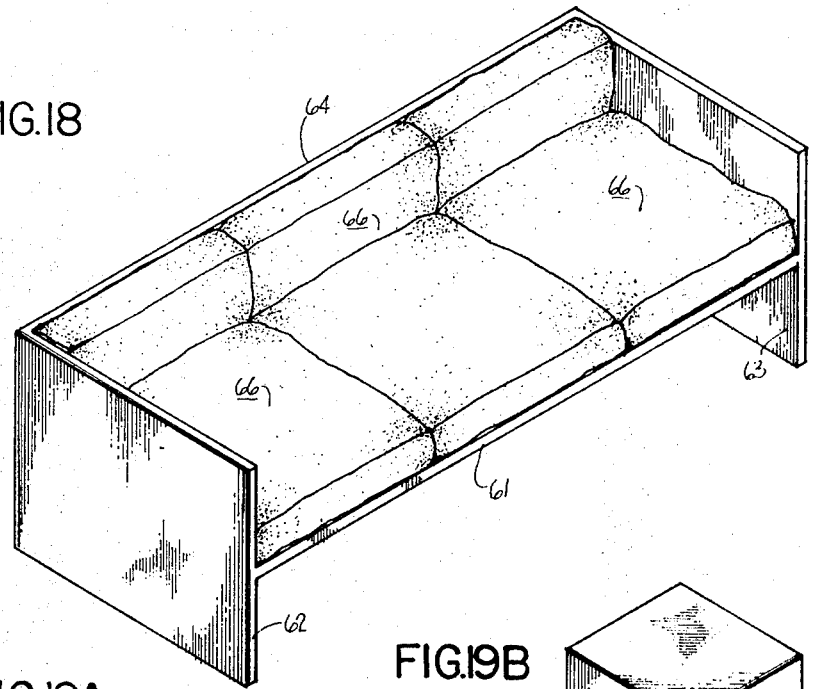
FIG. 18 is a perspective view of a sofa.
Figure 19A:
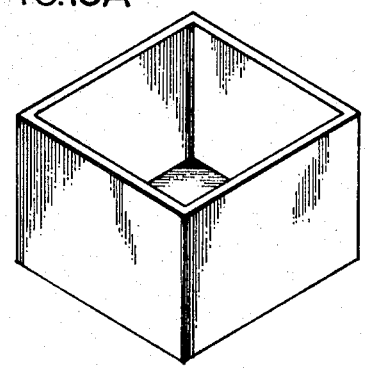
FIG. 19A is a perspective view of a planter, or planting box.
Figure 19B:
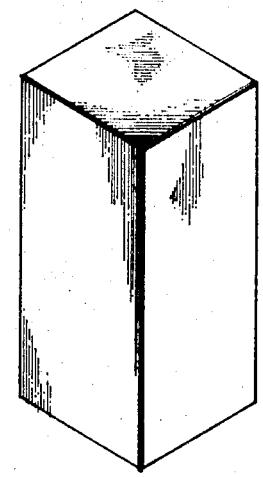
FIG. 19B is a perspective view of a sculpture stand or base.

The cored sheet metal structure (61, 62, 63, 64, FIG. 18) of the sofa (having cushions 66) may be made in a manner similar to that previously described, as may be the structures of FIGS. 19A and 19B.

The narrow areas formed by the flaps are generally about one-half to 1 inch wide (that is the spaced parallel main areas are about one-half to 1 inch apart). The main areas are generally about 1 to 7 feet on each side. The designations used to describe the finish of the stainless steel are those of the American Iron and Steel Institute.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. A panel structure comprising a plurality of flat parallel portions of sheet metal, spaced closely apart, said portions being of substantial area and measuring at least one foot on each side, adhered to both sides of a thin central porous low-density core, said core being shorter than said metal portions to provide spaces at the edges thereof, said parallel portions having complementary bent flat flaps in abutting relationship extending around the edges of said portions, said flaps welded together by melted weld metal at their meeting edges enclosing said core.

2. A panel structure as in claim 1 in which said parallel portions are substantially rectangular, being about 1 to 7 feet on each side, the spacing between said parallel portions is about one-half to 1 inch and said sheet metal is stainless steel and is about 0.02 to 0.08 inch thick.

3. A panel structure as in claim 1 in which said core is of foamed thermoplastic polymer and has a density of about 2 to 6 pounds per cubic foot.

4. A panel structure as in claim 3 in which said core is of foamed polyvinyl chloride.

5. A panel structure as in claim 1 in which said core is adhesively secured to said sheet metal and the edges of said core are spaced at least one-eighth inch from said flaps, whereby there is an air space at least one-eighth inch wide between said flaps and said core, said melted weld metal extends along a line halfway between the edges of said metal portions of substantial areas, and the exposed surface of said flaps and said weld metal is smooth and even while the hidden opposite surface of said flaps and weld metal is uneven.

6. A panel structure as in claim 5 in which said core is of foamed polyvinyl chloride having a density of about 2 to 6 pounds per cubic foot, said parallel sheet metal portions are substantially rectangular, being about 1 to 7 feet on each said, the spacing between said parallel portions is about one-half to 1 inch, said sheet metal is stainless steel about 0.02 to 0.08 inch thick and the edges of said core are spaced less than 1 inch from said flaps.